United States Patent
Roberts, Jr.

(10) Patent No.: US 6,223,050 B1
(45) Date of Patent: *Apr. 24, 2001

(54) SYSTEM AND METHOD FOR AUTOMATICALLY SETTING A REMOTE TIMEPIECE WITH THE CORRECT TIME

(75) Inventor: Evans V. Roberts, Jr., Marietta, GA (US)

(73) Assignee: Bellsouth Intellectual Property Management Corporation, Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,683

(22) Filed: Dec. 9, 1997

(51) Int. Cl.[7] ................ A04Q 7/20; G04G 7/02
(52) U.S. Cl. ............ 455/550; 455/566; 455/422; 368/47
(58) Field of Search ................ 455/432, 456, 455/457, 38.4, 422, 566, 433, 38.1, 550; 368/46, 47, 55; 340/825.44, 995

(56) References Cited

U.S. PATENT DOCUMENTS

| | | | |
|---|---|---|---|
| 5,265,070 | * 11/1993 | Minowa | 368/47 |
| 5,285,496 | * 2/1994 | Frank et al. | 380/9 |
| 5,363,377 | * 11/1994 | Sharpe | 370/100.1 |
| 5,375,104 | * 12/1994 | Ishii et al. | 368/22 |
| 5,455,807 | 10/1995 | Nepple et al. | 368/47 |
| 5,469,411 | * 11/1995 | Owen | 368/47 |
| 5,546,444 | 8/1996 | Roach, Jr. et al. | 379/59 |
| 5,590,092 | 12/1996 | Fehnel | 368/10 |
| 5,625,668 | * 4/1997 | Loomis et al. | 455/456 |
| 5,628,051 | * 5/1997 | Salin | 455/433 |
| 5,677,895 | * 10/1997 | Mankovitz | 368/10 |
| 5,712,867 | * 1/1998 | Yokev et al. | 455/38.1 |
| 5,724,316 | * 3/1998 | Brunts | 368/10 |
| 5,774,057 | * 6/1998 | Kalbermatter | 340/825.21 |
| 5,808,566 | * 9/1998 | Behr et al. | 340/995 |
| 5,845,257 | * 10/1998 | Fu et al. | 705/8 |
| 5,890,054 | * 3/1999 | Logsdon et al. | 455/11.1 |
| 5,920,824 | * 7/1999 | Beatty et al. | 455/550 |

FOREIGN PATENT DOCUMENTS

| | | |
|---|---|---|
| 0 618 744 A2 | 11/1988 | (EP) . |
| 0 828 205 A1 | 3/1998 | (EP) . |
| 2 245 399 | 1/1992 | (GB) . |
| WO 98/14842 | 4/1988 | (WO) . |

OTHER PUBLICATIONS

"NIST Network Time Service," from the National Institute of Standards and Technology Website, (http://www.bldrdoc.gov/timefreq/service/ACTS.htm), printed Oct. 9, 1997, pp. 1–3.

"Automated Computer Time Service (ACTS)," from the National Institute of Standards and Technology Website, (http://www.bldrdoc.gov/timefreq/service/acts/htm), printed Oct. 9, 1997, pp. 1–2.

(List continued on next page.)

*Primary Examiner*—Reinhard J. Eisenzopf
*Assistant Examiner*—Duc Nguyen
(74) *Attorney, Agent, or Firm*—Kilpatrick Stockton LLP (57) ABSTRACT

Setting a remote timepiece with the correct time using a time stamp transmitted over a data channel of a wireless telecommunications system. A data message is created which includes an address for the remote timepiece and a time stamp. The time stamp may include time and date information. The data message is transmitted over a data channel of the wireless telecommunications system. Based upon the address, the data message is received by the remote timepiece. The remote timepiece extracts the time stamp from the data message and uses the time stamp to set the remote timepiece in accordance with the time stamp.

3 Claims, 4 Drawing Sheets

OTHER PUBLICATIONS

"An Introduction to WWV Services," from the National Institute of Standards and Technology Website, (http://www.boulder.nist.gov/timefreq/wwv/wwv.html), printed Oct. 9, 1997, pp. 1–2.

"What Kind Of Information Does WWV Transmit?" from the National Institute of Standards and Technology Website, (http://www.boulder.nist.gov/timefreq/wwv/quests/iform.html), printed Oct. 9, 1997, pp. 1–4.

"How Does the Station Transmit the Signals?" from the National Institute of Standards and Technology Website, (http://www.boulder.nist.gov/timefreq/wwv/quests/trans.html), printed Oct. 9, 1997, p. 1.

"What is GOES?, " from the National Institute of Standards and Technology Website, (http://www.boulder.nist.gov/timefreq/wwv/quests/goes.html), printed Oct. 9, 1997, pp. 1–2.

"Are Commercial Wristwatches Which Receive NIST time Signals . . . Available In The United States?" from the National Institute of Standards and Technology Website, (http://www.boulder.nist.gov/timefreq/faq./q23.htm), printed Oct. 9, 1997, p. 1.

* cited by examiner

SYSTEM AND METHOD FOR AUTOMATICALLY SETTING A REMOTE TIMEPIECE WITH THE CORRECT TIME

FIELD OF THE INVENTION

This invention relates in general to setting a timepiece with the correct time, and more particularly to setting a remote timepiece with the correct time using a time stamp transmitted over a data channel of a wireless telecommunications system.

BACKGROUND OF THE INVENTION

Maintaining a hectic schedule requires effective time management and an accurate timepiece. The consequences of relying upon an inaccurate timepiece may include missing a connecting flight or arriving late to class. For example, if a passenger relies on an airport clock which is slow, then the passenger may miss a connecting flight. Likewise, if one professor relies on a clock which is slow and another professor relies on a clock which is fast, the first professor may dismiss class late while the second professor may begin class early, and students may miss the beginning of the second professor's class.

To keep everyone on time, clocks appear in a number of places. In an airport, clocks generally appear throughout the airport terminal. In a university, clocks typically appear in every classroom. In a home, a clock may be located on a wall or a bedside table or a clock may be part of an appliance, such as a microwave oven or a video cassette recorder ("VCR"). A clock must be initially set with the correct time. For example, an electric clock is typically set once power is applied. However, if the power to the clock is interrupted, then the clock must be reset. The power may be interrupted because the power fails or because the clock is disconnected to move the clock to another location. The clock must also be reset if the time changes, for example due to the start or end of daylight savings time. In a facility, such as an airport terminal or a university, every clock must be individually reset whenever power is interrupted or the time changes. In a home, every clock and every appliance including a clock must be manually reset whenever the power is interrupted or the time changes. The process of manually resetting every clock is time consuming and may result in incorrectly setting one or more of the clocks. It would be more efficient and more accurate if each clock could be automatically reset whenever the power is interrupted or the time changes.

In a facility such as an airport, the clocks located throughout the facility should be synchronized with any other devices which include a clock, such as a computer. Otherwise posted departure and arrival times may not coincide with the time displayed by the clocks. An automatic method for resetting the clocks throughout a facility would ensure that all of the clocks reflected the same correct time.

In a distributed system, data may be temporarily stored at a local site and then periodically transferred to a central site for further processing. For example, a distributed system for a chain of department stores may include point of sale terminals located throughout the department stores. For each sale, a point of sale terminal may record information about the sale, such as an inventory number, sales price, and time and date of the sale. The sales data collected during the day may be transferred to the central site at the end of the day. The sales data may be used to compile sales statistics, such as the number of sales which occurred during a particular promotion. If the time and date information recorded by the point of sale terminals is incorrect, then meaningful sales statistics cannot be compiled.

Thus, there is a need for a system and method for automatically setting and synchronizing the clocks of a variety of different devices. The time standard should be simple enough that it could be included in a home appliance without significantly increasing the size or cost of the appliance. The time standard should also be capable of transmission to a remote device.

One example of an accurate time source is the Coordinated Universal Time ("UTC") standard which is maintained by the National Institute of Standards and Technology ("NIST"). UTC is broadcast via radio stations located in Colorado and Hawaii. The broadcast signal includes seconds pulses which are transmitted every second, except on the 29th and the 59th seconds of each minute. In addition, voice announcements are broadcast once every minute. NIST also provides an automated computer time service which allows a computer to access UTC using a modem and an NIST server which allows a computer to access UTC via the Internet.

To access UTC from NIST, a device must include either a radio receiver or be capable of accessing a remote computer. Typically, an appliance, such as a microwave oven, does not have the capability of receiving a radio signal or accessing a remote computer. Even if a microwave oven could receive a radio signal, the appliance would need to convert the analog UTC signal to a digital signal to set its internal clock. Thus, there is a need for a system and method for automatically setting a clock which does not require conversion of an analog signal or access to a remote computer.

SUMMARY OF THE INVENTION

The present invention satisfies the above-described needs by providing a system and method for automatically setting a remote timepiece with the correct time. In one embodiment of the present invention, a cellular service provider creates a time stamp including time and date information. The time stamp is created using an existing switch of a cellular mobile radiotelephone ("CMR") system and is transmitted to a number of remote timepieces. The remote timepieces use the time stamp to set a clock.

Advantageously, the present invention provides a system and method for setting and synchronizing remote timepieces so that the remote timepieces are automatically reset whenever power to a remote timepiece is interrupted or the time changes. The present invention eliminates the need to manually reset a timepiece and ensures that all timepieces reflect the same correct time.

One preferred method for setting a remote timepiece utilizes a wireless telecommunications system including a wireless switch. A data message is created which includes an address for the remote timepiece and a time stamp. The data message is transmitted over a data channel of the wireless telecommunications system. Based upon the address, the data message is received by the remote timepiece. The remote timepiece extracts the time stamp from the data message and uses the time stamp to set the remote timepiece in accordance with the time stamp. Preferably, the steps of the method are repeated using an updated time stamp in place of the time stamp. The steps of the method may be repeated periodically. Alternatively, the steps of the method may be repeated whenever the activity of the wireless telecommunications system is within an acceptable range.

Preferably, the time stamp includes an hour, a minute and a second. The data message may also include a year, a month, and a day. The address included in the data message may be shared with a second remote timepiece. If the address is shared with a second remote timepiece, then the data message is transmitted to both the remote timepiece and the second remote timepiece.

In another preferred method for transmitting a time stamp to a remote timepiece using a wireless telecommunications system including a wireless switch, a time stamp is created using an output of a clock of the wireless switch. The time stamp includes an hour, a minute, and a second. The time stamp is used to create a data message. The data message is addressed to the remote timepiece and is transmitted to the remote timepiece over a data channel of the wireless telecommunications system. The steps of the method are repeated to transmit an updated time stamp in place of the time stamp. The updated time stamp includes an updated hour, an updated minute, and an updated second. Preferably, the steps are periodically repeated. Alternatively, the steps may be repeated whenever the level of system usage is within an acceptable level. Preferably, a first time stamp corresponding to a first time zone and a second time stamp corresponding to a second time zone are created and transmitted to the remote device.

A preferred system for providing periodic data messages over a data channel of a wireless telecommunications system includes a wireless switch and a remote timepiece. The wireless switch creates and transmits data messages including a first data message and a subsequent data message. The first data message includes a first time stamp corresponding to a first time and the subsequent data message includes a subsequent time stamp corresponding to a subsequent time. Preferably, the wireless switch includes a clock which may be used to generate the first time and the subsequent time. The first data message and the subsequent data message preferably include an address identifying the remote timepiece.

The remote timepiece receives the first data message and uses the first time stamp to set the remote timepiece to the first time. The remote timepiece receives the subsequent data message and uses the subsequent time stamp to set the remote timepiece to the subsequent time. Preferably, the remote timepiece includes a time zone input. The remote timepiece uses the time zone input to set the remote timepiece to an adjusted first time based upon the time zone input and the first time stamp and to set the remote timepiece to an adjusted subsequent time based upon the time zone input and the subsequent time stamp.

In yet another preferred method for automatically setting a remote timepiece, a data channel of a wireless telecommunications system is scanned for a data message addressed to the remote timepiece. The data message includes a time stamp. Once the data message is detected, then the data message is received. The time stamp included in the data message is used to set the remote timepiece to a time corresponding to the time stamp. Preferably, the steps of the method are repeated using a second data message including an updated time stamp.

If the remote timepiece includes a time zone input, then the time stamp is adjusted based upon the time zone input before the remote timepiece is set. Alternatively, the remote timepiece may include a time zone selector and the data message may include a first time stamp corresponding to a first time zone and a second time stamp corresponding to a second time zone. If the time zone selector selects the first time zone, then the remote timepiece is set to a time corresponding to the first time stamp. If the time zone selector selects the second time zone, then the remote timepiece is set to a time corresponding to the second time stamp. If the remote timepiece includes a daylight savings time input, then the time stamp is adjusted based upon the daylight savings time input before the remote timepiece is set.

Accordingly, it is an object of the present invention to provide a system and method for automatically setting and synchronizing the clocks of a variety of different devices. It is a further object of the invention to provide a system and method for setting a remote timepiece which does not require conversion of an analog signal or access to a remote computer.

These and other aspects, features and advantages of the present invention may be more clearly understood and appreciated from a review of the following detailed description of the disclosed embodiments and by reference to the appended drawings and claims.

DETAILED DESCRIPTION

The present invention is directed toward a system and method for automatically setting a remote timepiece with the correct time using a time stamp transmitted over a data channel of a wireless telecommunications system. The particular embodiments described herein are intended in all respects to be illustrative rather than restrictive. Alternative embodiments will become apparent to those skilled in the art to which the present invention pertains without departing from its spirit and scope.

Application of Invention by Cellular Service Provider

A representative application of the present invention is its use by a cellular provider to create a time stamp which is transmitted to a number of remote timepieces. The time stamp typically includes the time and date. The remote timepieces use the time stamp to synchronize and set a clock. The time stamp may be created and transmitted using the existing capabilities of a wireless telecommunications system, such as a CMR system. For example, an existing switch of a CMR system may be used to create and transmit the time stamp.

The time stamp is transmitted to customers of the cellular service provider. An exemplary customer of the cellular service provider may be a facility, such as an airport. The airport may use the time stamp to set and synchronize clocks located throughout the airport, as well as other devices which need accurate time and date information. The clocks and other devices in the airport which receive the time stamp are preferably assigned the same telephone number. The time stamp and the remote timepieces may be used to ensure that all of the clocks and other devices of the airport reflect the same correct time.

Another exemplary customer of the cellular service provider may be an appliance manufacturer, such as a VCR manufacturer. During assembly, the VCR manufacturer installs a remote timepiece in each VCR. The remote timepiece receives the time stamp and uses the time stamp to set an internal clock of the VCR. Preferably, each remote timepiece is assigned the same telephone number. By using the time stamp to set the clock of the VCR, the VCR always reflects the correct date and time even if the power to the VCR is interrupted or the time changes due to the beginning or ending of daylight savings time.

Yet another exemplary customer of the cellular service provider may be associated with a unique device, such as a large outdoor clock. The unique device may be assembled so that it includes a remote timepiece or the remote timepiece may be external to the device. If the remote timepiece is internal to the device, then the remote timepiece receives the time stamp and uses the time stamp to set an internal clock which drives the large clock. If the remote timepiece is external to the device, then the remote timepiece receives the time stamp and uses the time stamp to set the external device. Preferably, the remote timepiece associated with the device is assigned its own unique telephone number. If the power is interrupted or the time changes, the time stamp and the remote timepiece automatically reset the device, eliminating the need to manually reset the device.

Exemplary CMR Environment

Figure 1:
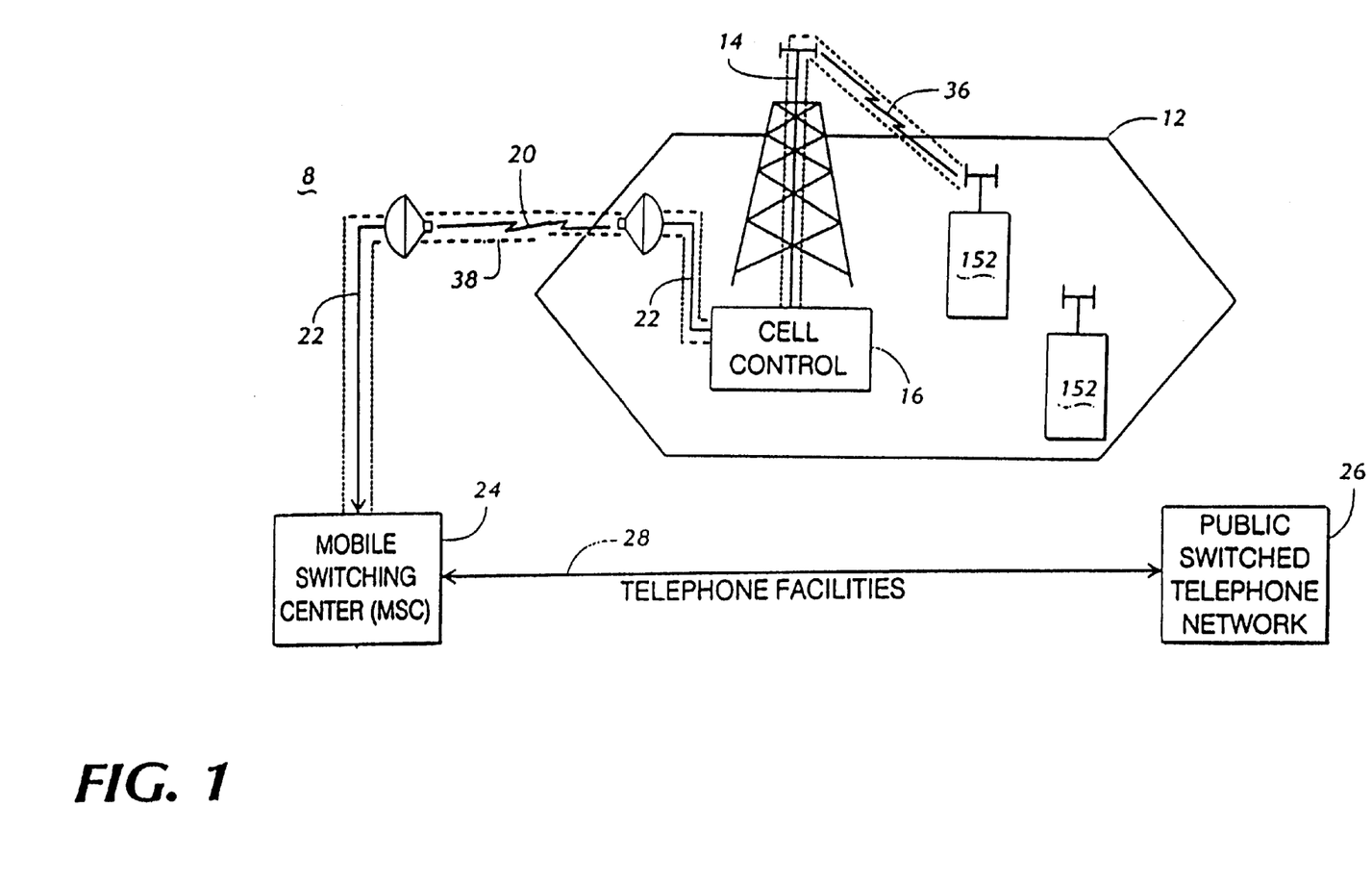
FIG. 1 is a block diagram of a CMR system illustrating the operating environment for a representative application of the present invention.

Preferably, the present invention is implemented using the existing architecture and communications protocols for a conventional CMR system. FIG. 1 is a functional block diagram illustrating a portion of a cellular mobile radiotelephone system 8. A typical CMR system includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. As a cellular communications device 152, such as a mobile radiotelephone, moves across the boundary of a cell into an adjacent cell, control circuitry associated with the cells detects that the signal strength of the mobile radiotelephone in the just-entered cell is stronger, and communications with the mobile radiotelephone are "handed-off" to the just-entered cell.

A mobile telephone switching office, such as the mobile switching center ("MSC") 24, can communicate with the cell 12 either by dedicated telephone facilities (not shown) or, more frequently, by a cell-to-mobile switching center data link 22 between the cell control 16 and the MSC 24. At least a portion of the data link 22 is typically supported by a wireless communications link, such as the microwave link 20, located between the cell 12 and the MSC 24. A conventional CMR system comprises at least one mobile telephone switch coupled to an appropriate array of more or less identically equipped cell sites 12. The MSC 24 normally couples telephone conversations involving mobile radiotelephones operating in the cell 12 to the public switched telephone network ("PSTN") 26 through telephone facilities 28.

A CMR system typically uses a pair of radio frequencies for each radio channel and each cell. Each cell typically includes at least one signaling channel, also referred to as a cellular network control channel or an access channel, and several voice channels. The control channel is selected or dedicated to receive requests for service from mobiles and portables, to page selected mobiles or portables, and to instruct the mobiles or portables to tune to a predetermined voice channel where a conversation may take place. Accordingly, the control channel is normally responsible for receiving and transmitting data to control the communication actions of the mobile and portable radiotelephones.

The MSC 24 sends and receives data messages via a forward control channel ("FOCC") and a reverse control channel ("RECC"). The FOCC is used for communications initiated by the MSC to a radiotelephone unit. In contrast, the RECC is used for communications from the radiotelephone to the MSC 24. In particular, the control channel 38 comprises two separate data communications paths, an FOCC for communications initiated by the MSC 24 and an RECC for communications initiated by a cellular communications devices 152, such as a mobile radiotelephones. The control channel is formed by a combination of the data link 22 and a cellular communications link 36.

Typically, the MSC includes a stratum time source (not shown). A stratum time source receives time signals from a plurality of clocks and outputs an extremely accurate time signal. The time signal is used for precise message timing within the MSC, the PSTN, and an external signal transport mechanism, i.e. a microwave radio. The clocks which feed the stratum time source may be supplied by GPS (Global Positioning System) satellites. The use of GPS clocks ensures the reliability of the stratum time source. If power to the stratum time source is interrupted, the stratum time source will automatically resynchronize itself to the correct time using the GPS clocks once power is restored to the time source.

To address a cellular communications device 152, a series of data messages are transmitted to the serving cell. These data messages always contain the low order seven digits of the device's telephone number, known as the Mobile Identification Number ("MIN"), the device's Station Class Mark ("SCM"), which identifies functional characteristics of the unit, and the Called Address, or dialed telephone number. Cellular system operators typically also require additional data words to be transmitted that contain the MIN2, which is the high order three digits or NPA of the device's telephone number, and the Electronic Serial Number ("ESN"). The MIN is typically assigned to a particular mobile radio telephone unit by the cellular service provider selected by the subscriber. The first three digits of the MIN ("XXX") typically correspond to an area code, the next three digits ("XXX") typically correspond to a geographic location within the area code; and the final four digits ("XXXX") identify a particular piece of equipment. Similarly, the ESN is unique to each mobile cellular radiotelephone unit, and comprises a format that allows differentiation as to manufacturer and, in some cases, the model number, date of manufacture, and the like. Additional information about CMR systems is available in the commonly assigned U.S. Pat. No. 5,546,444 entitled *Methods and Apparatus for Communicating Data Via a Cellular Network Control Channel*.

The data message and radio channel specifications for U.S. cellular radiotelephone systems are set forth in Electronic Industries Association/Telecommunications Industry Association ("EIA/TIA") Standard 553, implemented in accordance with 47 C.F.R. §22, in the Report and Orders pertaining to Federal Communications Commission ("FCC") Docket No. 79-318. Copies of the EIA/TIA-553 may be obtained from the Engineering Department of the Electronic Industries Association at 2001 Pennsylvania Avenue, N.W., Washington, D.C., USA 20006.

The cellular system 8 is preferably implemented as an AMPS or a DAMPS cellular system. However, it will be appreciated that the system also can be compatible with alternative cellular systems and personal communications systems implementing a control channel for mobile to cell communications, including: DCS 1800, GSM, IS 95CDMA, JTACS, TACS, ETACS, RC 2000, NMT 450, ESMR, CT-2, WACS, NMT 900, or other similar wireless systems.

Preferred CMR System for Creating and Transmitting a Time Stamp

In the preferred system for creating and transmitting a time stamp, the cellular devices 152 of FIG. 1 are remote timepieces. The remote timepieces may be included within a computer or an appliance, such as a VCR. A remote timepiece 152 is capable of receiving messages transmitted over a data channel of the CMR system, such as the control channel or the paging channel. Although a remote timepiece may include transmission capabilities, transmission capabilities are not required for receiving a time stamp. A number of remote timepieces may be located throughout the cells of the CMR system. Each timepiece is associated with an address which may be used to identify the timepiece. Typically the address is a telephone number. In one of the preferred embodiments, multiple remote timepieces may be assigned the same telephone number. For example, a single telephone number may be assigned to all VCR's manufactured by a certain manufacturer or a single telephone number may be assigned to all timepieces within a single facility, such as an airport. In another preferred embodiment, a telephone number may be assigned to a single remote timepiece. For example, a large outdoor clock may be assigned a unique telephone number. Preferably, the telephone number associated with the remote timepiece cannot be modified by a user.

A wireless switch, such as the MSC 24 of FIG. 1, creates a data message including a time stamp and an address for a remote timepiece. The time stamp typically includes date and time information. For example, the time stamp may include an hour, a minute, and a second, as well as a year, a month, and a day. The MSC creates the time stamp using the stratum clock of the MSC. The MSC determines the address for the remote device using a list of addresses (telephone numbers) for remote timepieces which is maintained in the MSC. The MSC formats the data message for transmission over a data channel of the CMR.

Figure 2:
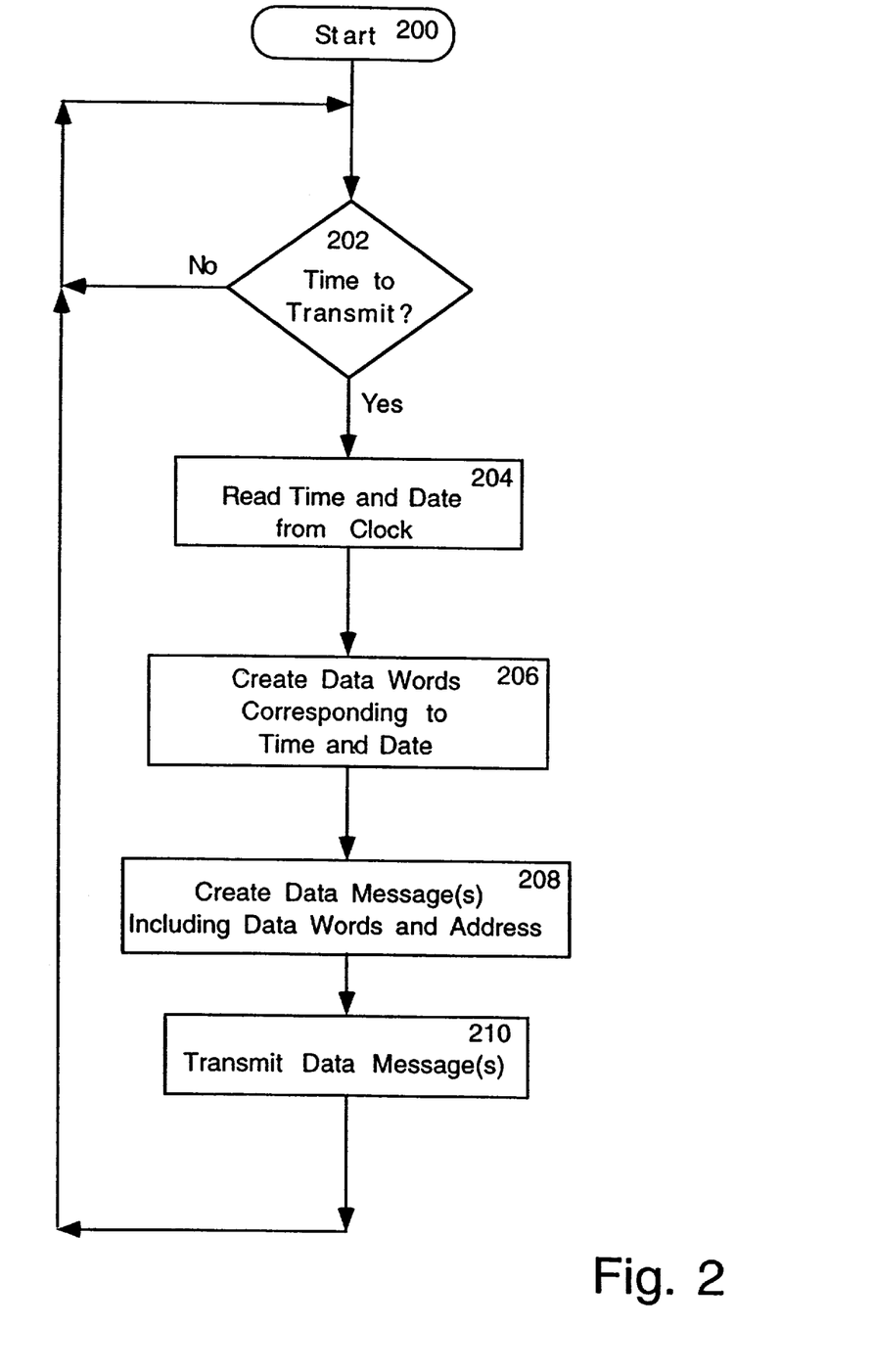
FIG. 2 is a logical flow diagram illustrating the steps for creating a data message in accordance with an embodiment of the present invention.

An exemplary method for generating and transmitting a time stamp is shown in FIG. 2. The method begins at step 200 and proceeds to step 202. In step 202, a determination is made as to whether it is time to create and transmit a time stamp. In some embodiments, a time stamp may be created and transmitted periodically, for example, once a second. In other embodiments, a time stamp may be created and transmitted more frequently during times of low system usage and less frequently during times of high system usage. If the determination in step 202 is that it is time to create and transmit a time stamp, then the method proceeds to step 204. If the determination in step 202 is that it is not time to create and transmit a time stamp, then the method loops back to step 202 until the determination is that it is time to create and transmit a time stamp.

In step 204, time and date information are read from an accurate time source, such as a stratum clock. Once the time and date information are read in step 204, the information is used to create a time stamp in step 206. The time stamp includes one or more data words corresponding to the time and date Preferably, the time information is formed into one data word and the date information is formed into another data word. The data words are used to create one or more data messages in step 208. Each data message includes an address, such as a telephone number, for a remote timepiece. Once the data message(s) are created in step 208, the method proceeds to step 210 where the data message(s) are transmitted to the remote timepieces. The method repeats by looping back to step 202 from step 210. By repeating the steps illustrated in FIG. 2, updated time and date information is provided to the remote timepieces.

The steps for generating a time stamp may be implemented in an MSC by modifying the existing programming in the switch. Typically, the programming is modified by the switch manufacturer. The programming is modified to derive the time and date from the stratum time source in the MSC, convert the time and date into digital data words, and transmit the data words to the remote timepieces as illustrated by FIG. 2.

As discussed in connection with step 202 of FIG. 2, the transmission of a time stamp may be periodic, for example every second, or may be dependent upon system usage. Typically, usage of a CMR system is heaviest in the morning and in the early evening. During times of heavy usage the time stamp may be transmitted less frequently than during times of light usage. The frequency of transmission of a time stamp may be the same for all remote timepieces or may vary among remote timepieces. If a particular remote timepiece requires a more accurate time signal, then the time stamp may be transmitted more frequently to that remote timepiece than to the other remote timepieces.

Figure 3:
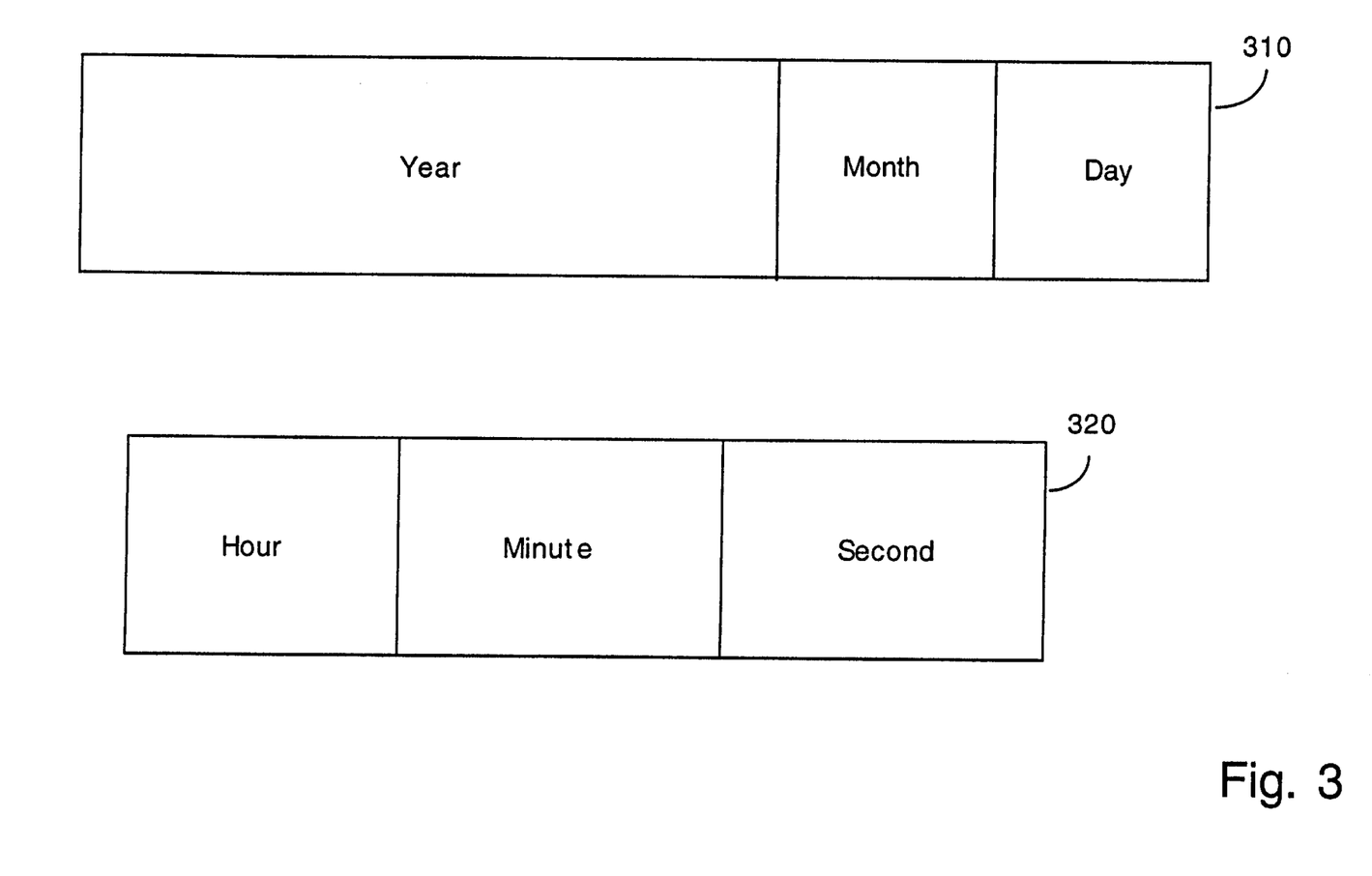
FIG. 3 illustrates a time stamp in accordance with an embodiment of the present invention.

An exemplary time stamp is shown in FIG. 3. The time stamp shown in FIG. 3 includes two data words; one data word for the time 310 and a second data word for the date 320. The data word for the time 310 includes five data bits for the hour (24-hour clock), six data bits for the minute and six data bits for the second. The data word for the date 320 includes twelve data bits for the year, four data bits for the month and five data bits for the day. As will be apparent to those skilled in the art, other time stamp configurations are possible. For example, rather than using five data bits for a 24-hour clock, the data word for the time could use four data bits for a 12-hour clock and an additional bit to indicate a.m. or p.m.

Figure 4:
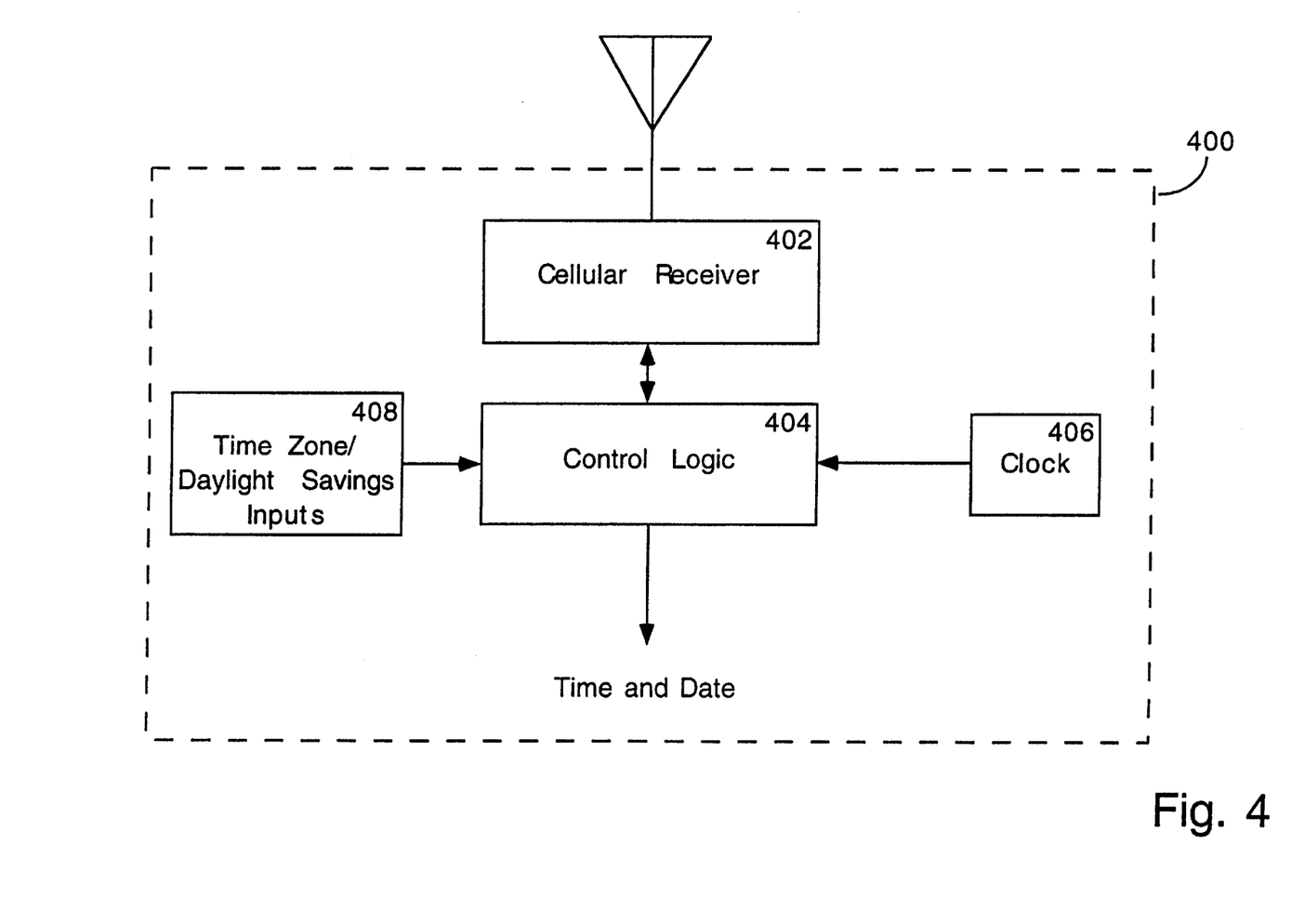
FIG. 4 is a block diagram of a receiver in accordance with an embodiment of the present invention.

A typical remote timepiece 400 is shown in FIG. 4. As shown in FIG. 4, each remote timepiece 400 includes a cellular receiver 402. The receiver 402 receives data messages from a MSC transmitted via the control channel or the paging channel. The remote timepiece 400 uses the time stamp included in the data message to synchronize a free running clock 406 in the remote timepiece 400. Typically, the control logic 404 and the free running clock 406 drive a clock display, such as an LED display (not shown). The remote timepiece 400 illustrated in FIG. 4 may be implemented as an internal or external component. If the remote timepiece is an internal component, then the time and date produced by the control logic 404 are used to set an internal clock, such as a clock included within a microwave oven. If the remote timepiece is an external component, then the time and date produced by the control logic 404 are used to set an external clock, such as an outdoor clock.

In one preferred embodiment, the remote timepiece 400 also includes a switch (not shown) or other input 408 for selecting the appropriate time zone. In this embodiment, there are two transmission options. The first transmission option is to transmit a different time stamp in each time zone. If the first transmission option is used, then the input 408 is used to select the correct time stamp if the remote timepiece straddles two time zones and detects two different time stamps. The second transmission option is to transmit the same time stamp in every time zone. If the second transmission stamp is used, then the input 408 is used to adjust the received time stamp for the selected time zone.

Preferably, the received time stamp is automatically adjusted for daylight savings time where applicable.

Alternatively, the remote timepiece may include a switch (not shown) or other input 408 for enabling daylight savings time. If the remote timepiece includes an input for enabling daylight savings time, then the adjustment for daylight savings time is made at the remote timepiece 400.

In another preferred embodiment, the remote timepiece 400 also includes a switch (not shown) or other input 408 for selecting the appropriate time zone. In this embodiment, different time stamps corresponding to the different time zones are transmitted. Based on the input 408, one of the transmitted time stamps is selected. To identify which time stamp corresponds to a particular time zone, the time stamps may be transmitted in a particular order or may include additional information to associate the time stamp with the correct time zone. For example, twenty-four time stamps may be transmitted corresponding to the twenty-four global time zones. If a series of time stamps are transmitted, then the remote timepiece selects the time stamp which corresponds to the selected time zone. Alternatively, each time stamp may include an identifier to identify the time zone associated with the time stamp. If the time stamp includes an identifier, than the remote timepiece decodes the identifiers and selects the time stamp which includes the identifier for the selected time zone.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is described by the appended claims and is supported by the foregoing description.

What is claimed is:

1. In a cellular mobile radiotelephone ("CMR") system, including a mobile switching center ("MSC") for transmitting messages to a remote timepiece located within an area of the CMR system served by the MSC, a method for setting the remote timepiece comprising the steps of:

(a) creating a data message having an address for the remote timepiece and a time stamp, the data message formatted for transmission by the MSC over a data channel of the CMR system;

(b) transmitting the data message to the remote timepiece using the data channel of the CMR system; and (c) receiving the data message by the remote timepiece based on the address, whereby the remote timepiece extracts the time stamp from the data message and uses the time stamp for setting the remote timepiece in accordance with the time stamp;

(d) measuring activity on the data channel; and (e) if the activity on the data channel is within an acceptable range, then repeating steps (a)–(c) using an updated time stamp in place of the time stamp in creating an updated data message, the updated time stamp reflecting time elapsed since the data message was created in step (a).

2. In a wireless telecommunications system capable of transmitting both voice and data, including a wireless switch for transmitting messages to a remote timepiece located within an area of the wireless telecommunications system served by the wireless switch, the wireless switch including a clock, a method for transmitting a time stamp to the remote timepiece, comprising the steps of:

(a) creating the time stamp using an output of the clock, the time stamp including an hour, a minute, and a second;

(b) creating a data message using the time stamp, the data message addressed to the remote timepiece;

(c) transmitting the data message to the remote timepiece over a data channel of the wireless telecommunications system;

(d) determining a level of system usage for the wireless telecommunications system; and (e) if the level of system usage is within an acceptable level, then repeating steps (a)–(c).

3. A method for automatically setting a remote timepiece based upon a time stamp transmitted over a data channel of a cellular mobile radiotelephone system, comprising the steps of:

(a) scanning the data channel for a data message addressed to the remote timepiece, wherein the data message includes the time stamp which corresponds to a first time zone and a second time stamp which corresponds to a second time zone, and wherein the remote timepiece includes a time zone selector to select the first time zone or the second time zone;

(b) once the data message is detected, then receiving the data message; and (c) setting the remote timepiece to a time corresponding to the time stamp by;
    if the first time zone is selected, then setting the remote timepiece using the time stamp; and
    if the second time zone is selected, then setting the remote timepiece using the second time stamp.

\* \* \* \* \*

UNITED STATES PATENT AND TRADEMARK OFFICE
CERTIFICATE OF CORRECTION

PATENT NO. : 6,223,050 B1
DATED : April 24, 2001
INVENTOR(S) : Evans V. Roberts, Jr.

It is certified that error appears in the above-identified patent and that said Letters Patent is hereby corrected as shown below:

Title page,
Item [73], Assignee, delete the following "[73] Assignee: BellSouth Intellectual Property Management Corporation, Atlanta, GA (US)" and insert in its place
-- [73] Assignee: BellSouth Intellectual Property Corporation, Wilmington, DE (US) --

Signed and Sealed this

Thirtieth Day of July, 2002

*Attest:*

*Attesting Officer*

JAMES E. ROGAN
*Director of the United States Patent and Trademark Office*